United States Patent
Thomas et al.

(10) Patent No.: US 10,240,460 B2
(45) Date of Patent: Mar. 26, 2019

(54) INSULATING COATING TO PERMIT HIGHER OPERATING TEMPERATURES

(71) Applicants: Rolls-Royce Corporation, Indianapolis, IN (US); Rolls-Royce North American Technologies, Inc., Indianapolis, IN (US)

(72) Inventors: David J. Thomas, Brownsburg, IN (US); Ted J. Freeman, Danville, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 1124 days.

(21) Appl. No.: 14/132,421

(22) Filed: Dec. 18, 2013

(65) Prior Publication Data

US 2015/0322795 A1    Nov. 12, 2015

Related U.S. Application Data

(60) Provisional application No. 61/768,448, filed on Feb. 23, 2013.

(51) Int. Cl.
*F01D 5/08*    (2006.01)
*F01D 5/18*    (2006.01)
(Continued)

(52) U.S. Cl.
CPC .............. *F01D 5/08* (2013.01); *F01D 5/188* (2013.01); *F01D 5/284* (2013.01); *F01D 5/288* (2013.01);
(Continued)

(58) Field of Classification Search
CPC . F01D 5/08; F01D 5/186; F01D 5/187; F01D 5/188; F01D 5/189; F01D 5/288;
(Continued)

(56) References Cited

U.S. PATENT DOCUMENTS 5,083,422 A     1/1992  Vogt
6,126,400 A *  10/2000  Nichols .................. F01D 5/288
                                                                415/177

(Continued)

FOREIGN PATENT DOCUMENTS

DE    102004028672 A1    1/2006
EP        0893653 A2    1/1999
(Continued)

OTHER PUBLICATIONS

International Search Report for PCT International Application Serial No. PCT/US2013/076293, dated Apr. 1, 2014, (11 pages).
(Continued)

*Primary Examiner* — Christopher Verdier
(74) *Attorney, Agent, or Firm* — Barnes & Thornburg LLP

(57) ABSTRACT

A gas turbine engine component includes an insulating coating that is adhered to a surface of the component that permits the component to operate at higher temperatures with reduced thermal stress. The coating can be selectively applied to one or more portions of a part feature where, in some embodiments, the part feature may include a portion that does not include the coating. The part feature can include recognized features of a component such as an interior surface of a hollow component, a back side of a blade track, a cooling hole passage, etc.

16 Claims, 2 Drawing Sheets

(51) Int. Cl.
*F01D 5/28* (2006.01)
*F01D 25/08* (2006.01)

(52) U.S. Cl.
CPC .......... *F01D 25/08* (2013.01); *F05D 2230/90* (2013.01); *F05D 2260/231* (2013.01); *F05D 2300/6033* (2013.01); *F05D 2300/611* (2013.01)

(58) Field of Classification Search
CPC .......... F01D 5/284; F01D 5/286; F01D 25/12; F05D 2260/201; F05D 2260/20; F05D 2260/202; F05D 2260/231; F05D 2230/90; F05D 2230/30; F05D 2230/31; F05D 2230/311; F05D 2300/6033; F05D 2300/611; F05D 2230/312
USPC ............ 415/115, 116; 416/96 R, 96 A, 97 R, 416/241 R, 241 B
See application file for complete search history.

(56) References Cited

U.S. PATENT DOCUMENTS

| | | |
|---|---|---|
| 6,283,714 B1 | 9/2001 | Rigney et al. |
| 6,283,715 B1 | 9/2001 | Nagaraj et al. |
| 6,393,828 B1 | 5/2002 | Zhao et al. |
| 6,526,756 B2 | 3/2003 | Johnson et al. |
| 6,533,547 B2 | 3/2003 | Anding et al. |
| 7,217,088 B2 | 5/2007 | Albrecht et al. |
| 7,481,621 B2 | 1/2009 | Campbell et al. |
| 7,665,960 B2 | 2/2010 | Shi et al. |
| 2003/0223861 A1* | 12/2003 | Morrison ................. F01D 5/189 415/115 |
| 2006/0263217 A1* | 11/2006 | Spanks, Jr. ............. F01D 5/186 416/97 R |
| 2006/0285973 A1 | 12/2006 | Keller |
| 2007/0036942 A1* | 2/2007 | Steele ..................... F01D 25/12 428/131 |
| 2009/0238684 A1 | 9/2009 | Morrison et al. |
| 2010/0170264 A1 | 7/2010 | Shi et al. |
| 2010/0183435 A1* | 7/2010 | Campbell ............... F01D 5/189 415/209.3 |
| 2011/0299999 A1* | 12/2011 | James ...................... B22C 9/04 416/97 R |
| 2012/0224975 A1 | 9/2012 | Carlin et al. |
| 2015/0251376 A1* | 9/2015 | Zhang .................... C04B 37/025 428/166 |

FOREIGN PATENT DOCUMENTS

| | | |
|---|---|---|
| EP | 0893653 B2 | 10/2012 |
| FR | 2921937 A1 | 1/2006 |

OTHER PUBLICATIONS

Office Action mailed by the European Patent Office dated Jul. 18, 2018 and issued in connection with European Patent Application No. 13818916.2.

* cited by examiner

INSULATING COATING TO PERMIT HIGHER OPERATING TEMPERATURES

CROSS REFERENCE TO RELATED APPLICATIONS

This application claims priority to and the benefit of U.S. Provisional Patent Application No. 61/768,448, filed 23 Feb. 2013, the disclosure of which is now expressly incorporated herein by reference.

TECHNICAL FIELD

The application generally relates to protecting gas turbine engine components from thermal stresses, and particularly, but not exclusively, to the selective application of thermal barrier coatings or environmental barrier coatings to insulate gas turbine engine components from a cooling effect to allow the components to run hotter than surrounding structure.

BACKGROUND

Ameliorating thermal induced stresses by discouraging cooling of a component and instead applying insulating coatings to permit higher running temperatures of a substrate of gas turbine engine components remain an area of interest. Some existing systems have various shortcomings relative to certain applications. Accordingly, there remains a need for further contributions in this area of technology.

SUMMARY

One embodiment of the present invention is a unique gas turbine engine component, such as a hot section component, having an adhered insulation coating that permits higher operating temperatures of the component. Other embodiments include apparatuses, systems, devices, hardware, methods, and combinations for insulating components to ameliorate thermal stresses. Further embodiments, forms, features, aspects, benefits, and advantages of the present application shall become apparent from the description and figures provided herewith.

BRIEF DESCRIPTION OF THE ILLUSTRATIONS

Embodiments of the invention are illustrated in the following illustrations;

DETAILED DESCRIPTION

Figure 1:
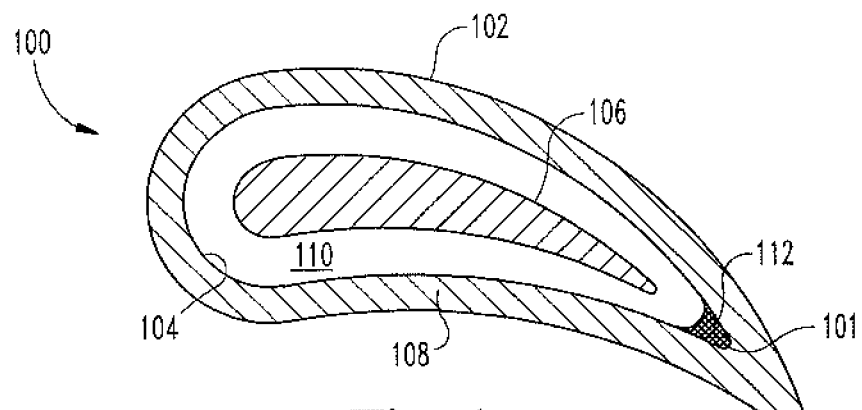
FIG. 1 is an end view cross-section of an airfoil of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring generally to the figures and description below, the present application provides for relatively high temperature gas turbine engine components that use coatings such as environmental barrier coatings (EBC) and thermal barrier coatings (TBC) as insulators so that the high temperature components maintain a relatively elevated temperature despite the presence of a cooling heat transfer. Such coatings can be applied over large areas of parts of the components, or can be selectively applied over smaller portions of the same parts. The coatings can be applied in areas where cooling by conduction, convective, or conductive effects such as through a cooling gas can lead to undesired thermal stresses. In one manner of operation such a protection acts to discourage the generation of adverse thermal stresses when the relatively high temperature components are located such as to be subject to impingement cooling if not protected by a coating such as an EBC or TBC. Other features will be appreciated given the description below.

Figure 2:
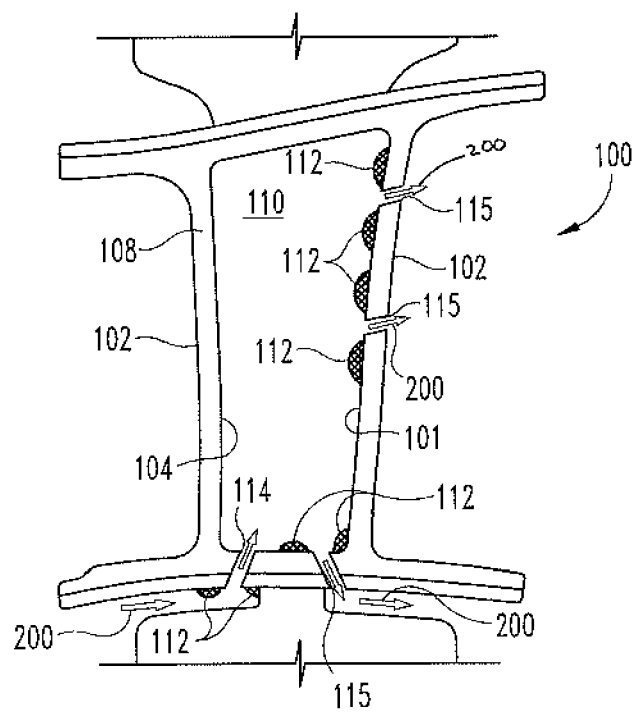
FIG. 2 is a side view cross-section of the airfoil in FIG. 1.

Referring now to FIGS. 1 and 2, an airfoil 100 of a gas turbine engine is provided in which is disposed an insulating coating useful to thermally protect the component from a cooling environment. The airfoil 100 may be a blade or a vane used in a turbomachinery component of a gas turbine engine. The airfoil 100 is provided with an airfoil wall 108 having an exterior surface 102 and an interior surface 104 that envelopes an interior hollow chamber 110. The interior hollow chamber 110 may house one or more internal support spars 106 and in some forms connecting structures between the spars 106 and the wall 108. The airfoil 100 may be made of a composite material such as, but not limited to, a ceramic matrix composite (CMC). The internal support spars 106 may be constructed from any suitable material including metal, intermetallic, composites, etc.

In one non-limiting embodiment the airfoil 100 is situated in a turbine of a gas turbine engine, such that the exterior surface 102 is exposed to a flow of hot combustion gases. A flow of cool or cooling gases 200 (arrows in FIG. 2) may be provided to flow through the interior hollow chamber 110 of the airfoil 100, such that the interior surface 104 is exposed to the flow of cool or cooling gases 200 that is at temperature cooler than that experienced by the exterior surface 102. This flow of cooling gases 200 is arranged in the illustrated embodiment to enter the interior hollow chamber 110 at a forward portion of the base of the airfoil 100 through one or more openings or inlets 114. Openings are also provided as outlets 115 along the length of the airfoil 100 and at an aft portion of the base of the airfoil 100. Additional inlets 114 and outlets 115 can be provided in addition to or in place of those depicted in the illustrated embodiment. Alternative locations of the inlets 114 and outlets 115 are also contemplated as will be appreciated.

The flow of cooling gases 200 may be provided for any variety of purposes such as cooling the support spars 106, delivering trailing edge film, or any number of other reasons readily apparent to one skilled in the art. A coating 112 may be selectively applied, for example, to areas where the cooling effect of these cooling gases is highest, which may be where the velocity of the cooling air is greatest relative to the rest of the flow path. For example, a part feature of the component, such as an interior surface of the airfoil 100, is exposed to the cooling flow, but only certain areas are treated to a coating so that thermal stresses are reduced to a desired level. Such areas where the cooling gas velocity is highest may be, for example, at openings 114, 115 through a component wall 108, or other narrowed passages in the flow path such as along the internal wall 104 at a trailing edge 101 of an airfoil 100. Alternatively, the coating 112 can be applied over a large area of the interior part of the airfoil 100, among other possibilities. This coating 112 can be a TBC and/or EBC in the illustrated embodiment, as well as any of the other embodiments described herein.

The coating 112 can be adhered to the surface using any variety of approaches such as spraying, non-line of sight spraying, brushing, and dipping, to set forth just a few non-limiting embodiments. The techniques of applying the coating result in a broad area of fine small scale adhesion. The coating 112 can be applied to any variety of thicknesses and can include multiple layers of the same or different constituents. In addition, the application of the coating 112 can be confined to an entire part feature of a gas turbine engine component (e.g. the entirety of a hollow interior of the airfoil 100), or to a portion of that part feature (e.g. near the cooling holes of the airfoil 100).

As will be appreciated, a part feature will be recognized to mean a particular, recognized part of a component. For example, a blade has a suction side part, a pressure side part, a leading edge part, a trailing edge part. Blades that are cooled also have a cooling passage part, cooling passage pedestal part, etc. An integrated vane assembly includes vane parts, endwall part, etc. A combustor can include a liner part, a casing part, etc. Numerous other examples are also contemplated herein and need not be recited in detail given the general understanding in the art. However, in general, a "part feature" is any feature that is recognized in the art as being associated with the component and is sometimes commonly referred to by those in the art to refer to parts for ease of convenience.

In many applications only a portion of the part feature will include the coating 112. For example, in one non-limiting embodiment where the part feature is a cooling passage, only a portion of the passage may be coated. Locations associated with the cooling passage that may be coated include the inlet to the cooling passage, where the inlet may be considered to be the inner surface of a passage closest to an opening from which the passage emerges, or it can also relate to the immediate area surrounding the opening such as that depicted in FIG. 2. The coating can be selectively applied to certain areas by limiting the application reach of an instrument used to apply the coating. For example, where a coating is brushed through the use of a device having bristles, the device can be limited in the areas in which it applies the coating. In other application techniques, such as spraying, the substrate upon which the coating is applied can be masked using any suitable device/material/etc. In short, the selective coating aspects can be accomplished in number of manners resulting in a wide variety of coating applications/patterns/etc. associated with any given part feature. In addition, the selective coating aspect permits the coating to be applied differently (e.g. one selective coating applied via brushing, another selective coating applied via dipping, etc.) and alternatively and/or additional can be applied at different thicknesses, material compositions, etc. In short, any variety of combinations of techniques, thicknesses, sizes, shapes, materials, can be used when determining particular selective coating applications.

Figure 3:
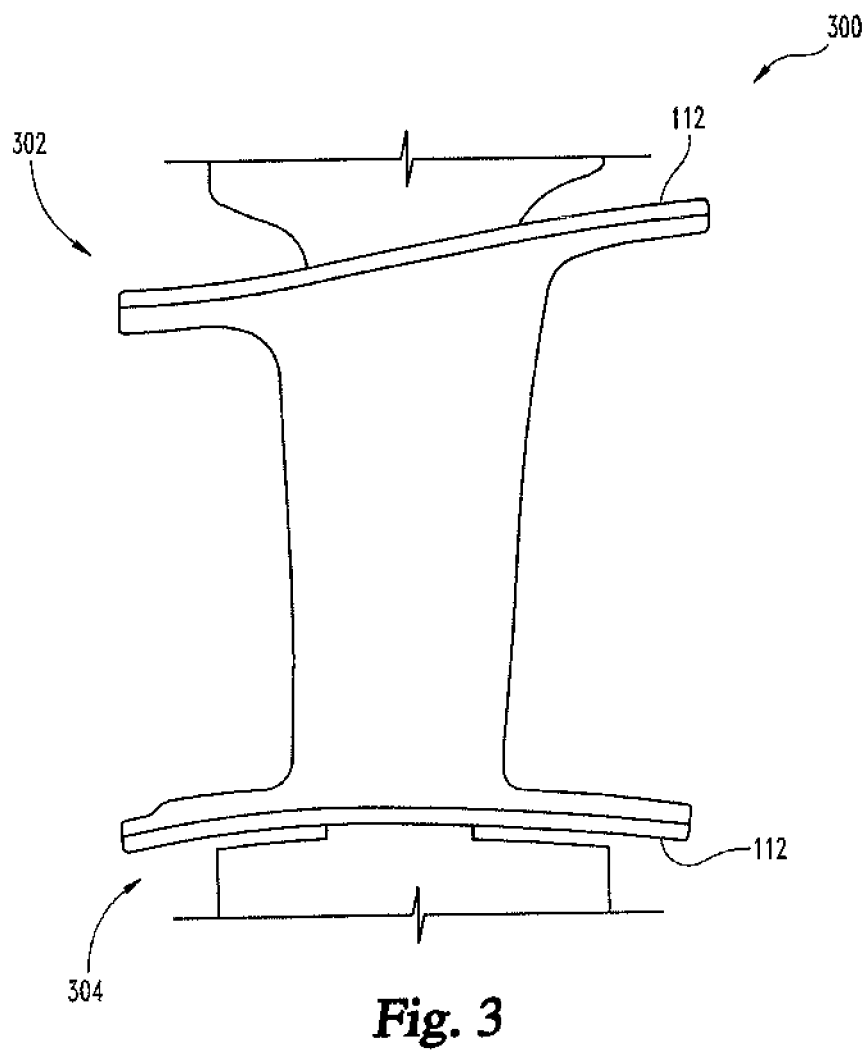
FIG. 3 is a side view cross-section of a combustion chamber of a gas turbine engine.

Turning now to FIG. 3, another non-limiting embodiment is disclosed in which an integrated vane and endwall 300 is shown having an application of coating 112 applied over the entire backside of endwalls 302 and 304. In the illustrated embodiment, endwalls 302 and 304 include the coating 112, but other embodiments may include only one endwall with the coating. Furthermore, some embodiments may have one of the endwalls 302 and 304 with a coating applied over its entire surface while the other of the endwalls 302 and 304 may have selective coating(s) 112 applied as in any of the above embodiments. Still further embodiments, both endwalls 302 and 304 may have selective coating(s) 112. Still further, some embodiments of endwalls 302 and 304 may include a coating 112 applied as in any embodiment herein while the other of the endwalls 302 and 304 may not include any coating 112.

The coating 112 on either or both endwalls 302 and 304 may be selectively applied to areas where a cooling effect is highest, for example an area where a velocity of a cooling air is greatest relative to the rest of the flow path. Such areas where the cooling gas velocity is highest may be, for example, at areas of non-uniform geometry, narrowed passages in the flow path, or in other areas where the cooling gases 200 are redirected. The other embodiments can apply coatings 112 to components such as a combustor liner or bladetracks, among any number of other possible components in the gas turbine engine. Such coatings 112 can include any of the variations of type, size, placement, application method, etc. mentioned above.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

In some embodiments, a method includes providing a gas turbine engine component constructed at least in a portion of a high temperature capable material, identifying a thermal stress area of the high temperature capable material upon which an adhesive coat of insulation can be applied to insulate the high temperature capable material and discourage adverse thermal stresses, and adhering the coat of insulation to the thermal stress area by depositing the coat of insulation upon the high temperature capable material of the gas turbine engine component. In illustrative embodiments, the applying the coat of insulation includes one of spraying, brushing, and dipping. In illustrative embodiments, the applying is accomplished over a limited portion, and wherein the high temperature capable material is a ceramic matrix composite.

In illustrative embodiments, the identifying is accomplished by examining a location of the ceramic matrix composite relative to a structure of a gas turbine engine to which the gas turbine engine component will be placed in proximity upon installation. In illustrative embodiments, the applying is in a region of impingement, convective, or conductive cooling, and wherein the applying includes positively confining the application of the coat of insulation to a limited area of the ceramic matrix composite relative to a larger area over which the coat of insulation can be applied without positively confining the application. In illustrative embodiments, the gas turbine engine component is a hot section component, wherein the coat of insulation is one of a thermal barrier coating and an environmental barrier coating, and wherein the identifying is accomplished concurrent with the applying.

What is claimed is:

1. An apparatus comprising:
a gas turbine engine having a ceramic matrix composite component subject to elevated temperature, a metallic component located within the ceramic matrix composite component, and a cool region of the gas turbine engine defined between an inner surface of the ceramic matrix composite component and an outermost surface of the metallic component;
wherein the ceramic matrix composite component includes an adhered coating that includes a heat insulating material composition and that is coupled to the inner surface of the ceramic matrix composite component, the adhered coating is spaced apart from the outermost surface of the metallic component, and the adhered coating is positioned in the cool region and insulates the ceramic matrix composite component from a cooling effect that produces an adverse thermal stress.

2. The apparatus of claim 1, wherein the adhered coating is selectively applied to a plurality of discrete locations upon the inner surface of the ceramic matrix composite component.

3. The apparatus of claim 2, wherein the ceramic matrix composite component is a hot section component of the gas turbine engine, and wherein the plurality of discrete locations are confined within a part feature of the ceramic matrix composite component.

4. The apparatus of claim 3, wherein the adhered coating is one of a thermal barrier coating or an environmental barrier coating.

5. The apparatus of claim 1, wherein the ceramic matrix composite component is in contact with the metallic component, and wherein the cool region of the gas turbine engine is the outermost surface of the metallic component.

6. The apparatus of claim 1, wherein the adhered coating is exposed to a cooling fluid that is flowed adjacent the ceramic matrix composite component during operation of the gas turbine engine, the adhered coating oriented to discourage convective cooling of the ceramic matrix composite component.

7. An apparatus comprising:
a ceramic matrix composite airfoil having a plurality of part features and an insulating coat adhered to a first portion of one of the plurality of part features, wherein the one of the plurality of part features includes a second portion free of the insulating coat;
wherein the ceramic matrix composite airfoil has an open interior defined by an inner surface of the ceramic matrix composite airfoil and through which flows a cooling fluid, the insulating coat applied on the inner surface, and
wherein the ceramic matrix composite airfoil is formed to define a cooling hole that extends through the ceramic matrix composite airfoil to provide fluid communication between the open interior and gases surrounding an outer surface of the ceramic matrix composite airfoil, the cooling hole includes a cooling hole inlet, and wherein the insulating coat is applied to the inner surface of the ceramic matrix composite airfoil in an area directly adjacent the cooling hole inlet such that heat transfer between the cooling fluid and the ceramic matrix composite airfoil is discouraged in the area directly adjacent the cooling hole inlet by virtue of insulating properties of the insulating coat.

8. The apparatus of claim 7, wherein the insulating coat is applied to a trailing edge of the ceramic matrix composite airfoil.

9. The apparatus of claim 7, wherein the insulating coat is one of a thermal barrier coating and an environmental barrier coating.

10. The apparatus of claim 7, further comprising a metallic component located in the open interior of the ceramic matrix composite airfoil and the entire metallic component is spaced apart from the insulating coat and the cooling hole inlet.

11. A method comprising:
providing an airfoil-shaped metallic gas turbine engine component and a ceramic matrix composite component, the airfoil-shaped metallic gas turbine engine component positioned in an open interior of at least a portion of the ceramic matrix composite component;
identifying a thermal stress area of the ceramic matrix composite component upon which an adhesive coat of insulation can be applied to insulate the ceramic matrix composite component and discourage adverse thermal stresses; and
applying the coat of insulation to the thermal stress area by depositing the coat of insulation upon an inner surface of the ceramic matrix composite component, the coat of insulation spaced apart entirely from the airfoil-shaped metallic gas turbine engine component.

12. The method of claim 11, wherein the applying the coat of insulation includes one of spraying, brushing, and dipping.

13. The method of claim 11, wherein the applying is accomplished over a limited portion of the inner surface.

14. The method of claim 13, wherein the identifying is accomplished by examining a location of the ceramic matrix composite component relative to a structure of a gas turbine engine to which the airfoil-shaped metallic gas turbine engine component will be placed in proximity upon installation.

15. The method of claim 14, wherein the applying is in a region of impingement, convective, or conductive cooling, and wherein the applying includes positively confining the application of the coat of insulation to a limited area of the ceramic matrix composite component relative to a larger area over which the coat of insulation can be applied without positively confining the application.

16. The method of claim 14, wherein the airfoil-shaped metallic gas turbine engine component is a hot section component, wherein the coat of insulation is one of a thermal barrier coating and an environmental barrier coating, and wherein the identifying is accomplished concurrent with the applying.

* * * * *